United States Patent
Sato et al.

(10) Patent No.: US 7,036,865 B2
(45) Date of Patent: May 2, 2006

(54) AUTOMOBILE INSTRUMENT PANEL STRUCTURE

(75) Inventors: Tadashi Sato, Wako (JP); Tetsuji Fukushima, Wako (JP); Hidetoshi Kabayama, Wako (JP); Naoya Chinzai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/099,763

(22) Filed: Apr. 6, 2005

(65) Prior Publication Data

US 2005/0253409 A1   Nov. 17, 2005

(30) Foreign Application Priority Data

Apr. 8, 2004   (JP)   .............................. 2004-114105
Apr. 8, 2004   (JP)   .............................. 2004-114106
Apr. 8, 2004   (JP)   .............................. 2004-114107
Apr. 8, 2004   (JP)   .............................. 2004-114108

(51) Int. Cl.
B62D 25/14   (2006.01)

(52) U.S. Cl. ........................... 296/70; 180/90; 280/752
(58) Field of Classification Search ................ 296/70, 296/24.1; 116/286; 180/90; 280/752; D12/192, D12/145

See application file for complete search history.

(56) References Cited

U.S. PATENT DOCUMENTS 2,855,066 A * 10/1958 Nallinger ................. 280/752
D401,201 S * 11/1998 Saleen .................... D12/192
5,857,726 A * 1/1999 Yokoyama et al. ........... 296/70
D410,608 S * 6/1999 Kraus .................... D12/192
D488,417 S * 4/2004 Herrera, Jr. ............. D12/192
D492,213 S * 6/2004 Day et al. ................ D10/103
2002/0153741 A1* 10/2002 Speelman et al. ............ 296/70

FOREIGN PATENT DOCUMENTS

JP   2000-168400   6/2000

* cited by examiner

Primary Examiner—Jason Morrow
(74) Attorney, Agent, or Firm—Rankin, Hill, Porter & Clark LLP

(57) ABSTRACT

In an automobile instrument panel structure, an upper meter provided in an upper front part of an instrument panel main body is disposed so as to correspond to an upper side of an upper half of a steering wheel, and a lower meter provided in a lower rear part of the instrument panel main body is disposed so as to correspond to a lower side of the upper half of the steering wheel. It is thus possible to reliably view the upper meter and the lower meter without being obstructed by the steering wheel. Further, since an upper edge of a panel in which the upper meter is disposed has a shape substantially conforming to the upper half of the steering wheel, there is no disagreeable sensation even when the upper meter, which has conventionally been disposed in a laterally central part of the instrument panel main body, is disposed in front of the driver. Furthermore, since the panel can be attached to and detached from the instrument panel main body, maintenance can easily be carried out for the upper meter and the lower meter by removing the panel.

10 Claims, 9 Drawing Sheets

AUTOMOBILE INSTRUMENT PANEL STRUCTURE

RELATED APPLICATION DATA

The Japanese priority application Nos. 2004-114105, 2004-114106, 2004-114107 and 2004-114108 upon which the present application is based are hereby incorporated in their entirety herein by reference.

BACKGROUND OF THE INVENTION

1. Field of the Invention

The present invention relates to an automobile instrument panel structure in which an upper meter and a lower meter are respectively supported on an upper front part and a lower rear part of an instrument panel main body, and a panel is detachably fixed to the instrument panel main body so as to surround the perimeter of the upper meter and the perimeter of the lower meter.

2. Description of the Related Art

Japanese Patent Application Laid-open No. 2000-168400 discloses an arrangement in which an entertainment display for displaying information such as road map information that contains a large amount of information but has low urgency, is disposed in a central position in the vehicle width direction, and a driving display for displaying information such as route guide information, urgent road traffic information, or disabled persons contact information that contains a small amount of information but has high urgency, is disposed at a high position on a driver's side relative to the entertainment display, thereby enhancing the visibility of the driving display.

Since the line of sight of the driver is directed substantially toward the front of the vehicle while the driver drivies it, if a meter is disposed at a position that is laterally displaced from the front of the driver, the amount of movement of the line of sight of the driver between when looking at the view in front and when looking at the meter increases, leading to a problem that the visibility of the meter is degraded. In particular, if the meter is disposed at a position close to the driver, the time taken for focusing the eyes between when looking at the view in front and when looking at the meter becomes long, leading to a possibility that the visibility of the meter might be further degraded.

SUMMARY OF THE INVENTION

The present invention has been accomplished under the above-mentioned circumstances, and it is an object thereof to enhance the visibility of an upper meter and a lower meter provided on an instrument panel main body.

In order to attain this object, in accordance with a first aspect of the present invention, there is proposed an automobile instrument panel structure in which an upper meter and a lower meter are respectively supported on an upper front part and a lower rear part of an instrument panel main body, and a panel is detachably fixed to the instrument panel main body so as to surround the perimeter of the upper meter and the perimeter of the lower meter, wherein the upper meter and the lower meter are respectively disposed so as to correspond to an upper side and a lower side of an upper half of a steering wheel, and wherein an upper edge of the panel has a shape substantially conforming to the upper half of the steering wheel.

In accordance with this arrangement, since the upper meter provided in the upper front part of the instrument panel main body is disposed so as to correspond to the upper side of the upper half of the steering wheel, and the lower meter provided in the lower rear part of the instrument panel main body is disposed so as to correspond to the lower side of the upper half of the steering wheel, it is possible to reliably view the upper meter and the lower meter without being obstructed by the steering wheel. Further, since the upper edge of the panel in which the upper meter is disposed has the shape substantially conforming to the upper half of the steering wheel, there is no disagreeable sensation even when the upper meter, which has conventionally been disposed in a laterally central part of the instrument panel main body, is disposed in front of the driver. Furthermore, since the panel can be attached to and detached from the instrument panel main body, maintenance can easily be carried out for the upper meter and the lower meter by removing the panel. Moreover, even when a rear edge of a canopy portion of the panel covering the upper meter is curved downward in order to ensure a forward view for the driver, providing no interference when the upper meter is mounted on the instrument panel main body.

Furthermore, in accordance with a second aspect of the present invention, in addition to the first aspect, the panel is divided into an upper panel and a lower panel.

In accordance with this arrangement, since the panel is divided into the upper panel and the lower panel, the upper panel and the lower panel may be formed so as to employ different structures or materials such that, for example, the upper panel has a skin and the lower panel has no skin, thus enhancing the general-purpose features of the design.

Moreover, in accordance with a third aspect of the present invention, in addition to the first aspect, the upper meter includes at least one of a speedometer and a tachometer.

In accordance with this arrangement, since the upper meter is disposed in the upper front part of the instrument panel main body, not only is it possible to reduce the amount in which the line of sight moves when the line of sight is moved between the view in front and the upper meter, but it is also possible to enhance the visibility of the upper meter because the distance between the driver and the upper meter increases and focusing of the eyes becomes easy. Since this upper meter having high visibility includes at least one of the speedometer and the tachometer, which are highly important, it is possible to reliably read the speedometer or the tachometer.

Furthermore, in accordance with a fourth aspect of the present invention, in addition to the first aspect, there is proposed the automobile instrument panel structure further comprising a meter visor, wherein the panel is formed from a core material and a skin, has an opening formed therein so as to surround the perimeter of the meter, and is fixed to the instrument panel main body; the meter visor provides a connection between the perimeter of the meter and the opening of the panel, and is formed from an upper meter visor and a lower meter visor; and a groove formed at a rear end of the upper meter visor is engaged with an edge portion formed by folding an upper edge of the opening downward and forward.

In accordance with this arrangement, since the meter visor providing the connection between the perimeter of the meter and the opening of the panel is formed from the upper meter visor and the lower meter visor, and the upper meter visor is installed from the front to the rear instead of being installed from the rear to the front, it is possible to eliminate the necessity to push and bend upward the upper edge of the opening when installing the upper meter visor, thus enhancing the ease of installing the upper meter visor. Moreover, since the groove formed at the rear end of the upper meter visor is engaged with the edge portion formed by folding the upper edge of the opening of the panel downward and forward, it is possible to eliminate the necessity for providing the upper edge of the opening of the panel with a mounting seat for mounting the rear end of the upper meter visor, thereby suppressing upward protrusion of the upper edge of the opening of the panel and ensuring a forward view for the driver. Furthermore, since the groove at the rear end of the upper meter visor is engaged with the edge portion of the opening of the panel, it is possible to retain the folded back portion (ear portion) of the skin of the panel by means of the groove, thus improving the appearance.

Moreover, in accordance with a fifth aspect of the present invention, in addition to the fourth aspect, a lower edge of the opening is retained from above by means of the rear end of the lower meter visor.

In accordance with this arrangement, since the lower edge of the opening is retained from above by means of the rear end of the lower meter visor, it is possible to make the lower edge of the opening of the panel invisible, thus improving the appearance.

Furthermore, in accordance with a sixth aspect of the present invention, in addition to the fourth aspect, the upper meter visor is connected to the upper edge of the opening, and the lower meter visor is connected to the lower edge and left and right edges on opposite sides of the opening.

In accordance with this arrangement, since the upper meter visor is connected to the upper edge of the opening, and the lower meter visor is connected to the lower edge and the left and right edges on opposite sides of the opening, a seam between the upper meter visor and the lower meter visor is positioned in a corner portion of the meter visor and extends away parallel to the line of sight; thus making the seam less noticeable.

Moreover, in accordance with a seventh aspect of the present invention, in addition to the fourth aspect, the lower meter visor has a decorative surface that forms a smooth connection to the surface of the panel.

In accordance with this arrangement, since the lower meter visor is provided with the decorative surface that forms a smooth connection to the surface of the panel, it is possible by utilizing the decorative surface to ensure an area of a fixing portion for fixing the lower meter visor to the panel, thus mounting the lower meter visor on the panel strongly and with a good appearance.

Furthermore, in accordance with an eighth aspect of the present invention, in addition to the fourth aspect, there is proposed the automobile instrument panel structure wherein a rib is provided on a reverse side of the opening of the panel which is covered by the upper meter visor.

In accordance with this arrangement, since the rib is provided on the reverse side of the opening of the panel, which is covered by the upper meter visor, it is possible to enhance the rigidity of a mounting portion of the upper meter visor, thus enabling the upper meter visor to be reliably fixed to the panel.

Moreover, in accordance with a ninth aspect of the present invention, in addition to the first aspect, there is proposed the automobile instrument panel structure further comprising a meter visor, wherein the instrument panel main body supports a substantially rectangular meter; the panel fixed to the instrument panel main body has an opening to the rear of the meters; the meter visor provides a connection between the perimeter of the meter and the opening of the panel, and is formed from an upper wall, a lower wall, and left and right side walls; a vertical spacing between the upper wall and the lower wall of the meter visor narrows toward the meters; and a lateral spacing between the left and right side walls of the meter visor is constant or widens toward the meter.

In accordance with this arrangement, when the panel having the opening to the rear of the substantially rectangular meter supported on the instrument panel main body is fixed to the instrument panel main body, and the perimeter of the meter is connected to the opening of the panel by means of the meter visor formed from the upper wall, the lower wall, and the left and right side walls, the vertical spacing between the upper wall and the lower wall of the meter visor narrows toward the meter, even if the height of the eyes of drivers varies due to differences in the height of the drivers. Therefore, there is no possibility of the upper and lower edges of the meter being hidden by the meter visor to become invisible.

Further, even when the height of drivers varies, the lateral position of the eyes changes little as long as the driver is seated correctly on a seat. Therefore, even if the lateral spacing between the left and right side walls of the meter visor is made constant or widens from the opening of the panel toward the meter, there is no possibility of the left and right side edges of the meter being hidden by the meter visor to become invisible. Thus, it is possible to minimize the area of the opening at the rear end of the meter visor, suppress the reflection of light on the surface of the meter so as to enhance the visibility, and utilize the space of the panel surface.

Furthermore, in accordance with a tenth aspect of the present invention, in addition to the ninth aspect, the meter visor is formed from an upper meter visor that has an upper wall and left and right side walls, and a lower meter visor that has a lower wall connected to lower ends of the left and right side walls.

In accordance with this arrangement, since the meter visor is formed from the upper meter visor that has the upper wall and the left and right side walls, and the lower meter visor that has the lower wall connected to the lower ends of the left and right side walls, a seam between the upper meter visor and the lower meter visor is positioned in a corner portion of the meter visor and extends away parallel to the line of sight, thus making the seam less noticeable.

Further, when the spacing between the upper wall and the lower wall of the meter visor narrows toward the front, and the spacing between the left and right side walls of the meter visor is constant or widens toward the front, it becomes difficult to mold the meter visor as one member due to undercut or draft, but since the meter visor is divided into two, that is, the upper meter visor and the lower meter visor, the molding thereof becomes easy.

Furthermore, in accordance with an eleventh aspect of the present invention, in addition to the ninth aspect, the meter visor is formed from an upper meter visor and a lower meter visor, and the lower meter visor defines an upper face of an opening through which a steering shaft runs.

In accordance with this arrangement, since the meter visor is formed from the upper meter visor and the lower meter visor, and the lower meter visor defines the upper face of the opening through which the steering shaft runs, not only is it possible to reduce the number of components because it is unnecessary to employ a special member for defining the upper face of the opening through which the steering shaft runs, but it is also possible to reduce the number of seams due to the reduction in the number of components, thus improving the appearance.

Furthermore, in accordance with a twelfth aspect of the present invention, in addition to the first aspect, at least a rear portion of the instrument panel, on a front portion of which the meters are supported, is joined to a crossbeam extending in the lateral direction of a vehicle body, a dashboard lower part positioned forward of the instrument panel and the crossbeam are connected to each other via a bracket, and the front portion of the instrument panel and the bracket are connected to each other via an air conditioner duct that extends in the lateral direction of the vehicle body.

The rigidity for supporting the front portion of the instrument panel, on which the weight of the meter is imposed, is insufficient by joining only at least the rear portion of the instrument panel, on the front portion of which the meters are supported, to the crossbeam extending in the lateral direction of the vehicle body. However, in accordance with the arrangement of the twelfth aspect, since the dashboard lower part positioned forward of the instrument panel and the crossbeam are connected to each other via the bracket, and the front portion of the instrument panel and the bracket are connected to each other via the air conditioner duct extending in the lateral direction of the vehicle body, it is possible to strongly support the front portion of the instrument panel by mutual reinforcement between the crossbeam, the dashboard lower part, the bracket, and the air conditioner duct. In particular, by utilizing for reinforcement the air conditioner duct, which is conventionally disposed in the interior of the instrument panel, it is possible to minimize any increase in the number of components.

Moreover, in accordance with a thirteenth aspect of the present invention, in addition to the twelfth aspect, there is proposed the automobile instrument panel structure wherein the air conditioner duct and the instrument panel are connected by vibration-welding.

In accordance with this arrangement, since the air conditioner duct and the instrument panel are connected by vibration-welding, it is possible to strongly integrate the air conditioner duct and the instrument panel, thus further enhancing the rigidity with which the instrument panel is supported.

In the first to the third aspects, an upper panel 13 of an embodiment corresponds to the panel of the present invention, and a lower left panel 14 of the embodiment corresponds to the panel or the lower panel of the present invention.

Furthermore, in the fourth to the eighth aspects, the upper panel 13 of the embodiment corresponds to the panel of the present invention, and an upper meter 16 of the embodiment corresponds to the meter of the present invention.

Moreover, in the ninth to the eleventh aspects, the lower left panel 14 of the embodiment corresponds to the panel of the present invention, and a lower meter 18 of the embodiment corresponds to the meter of the present invention.

Furthermore, in the twelfth and thirteenth aspects, the upper meter 16 of the embodiment corresponds to the meter of the present invention, and a first air conditioner duct 28 of the embodiment corresponds to the air conditioner duct of the present invention.

The above-mentioned objects, other objects, characteristics, and advantages of the present invention will become apparent from an explanation of a preferred embodiment that will be described in detail below by reference to the attached drawings.

DESCRIPTION OF THE PREFERRED EMBODIMENT

An embodiment of the present invention is described below by reference to FIG. 1 to FIG. 11.

The front, rear, left, and right referred to in the present specification are defined so as to correspond to the front, rear, left, and right of a vehicle.

Figure 1:
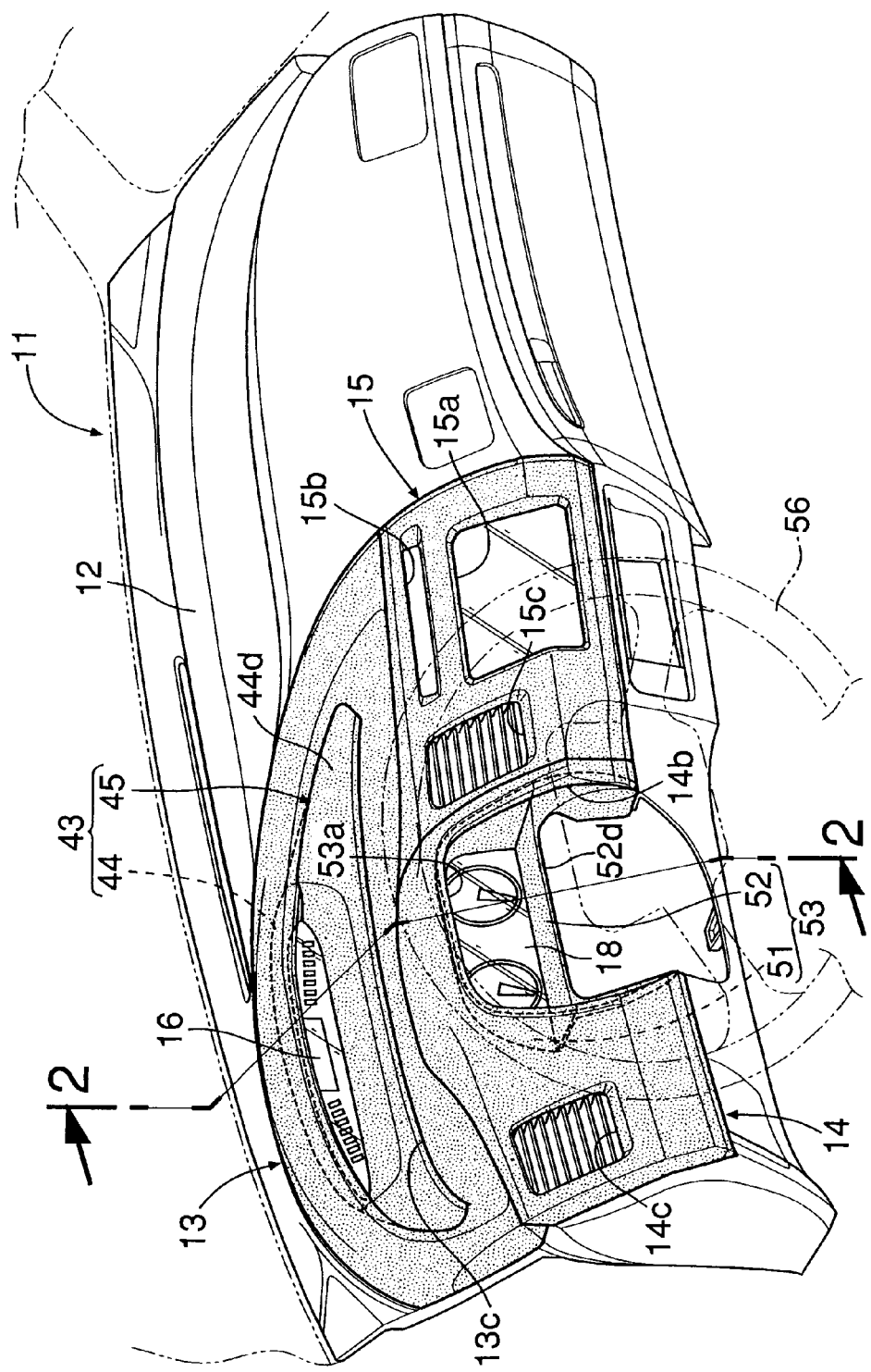
FIG. 1 is a perspective view of an automobile instrument panel according to one embodiment of the present invention.
Figure 2:
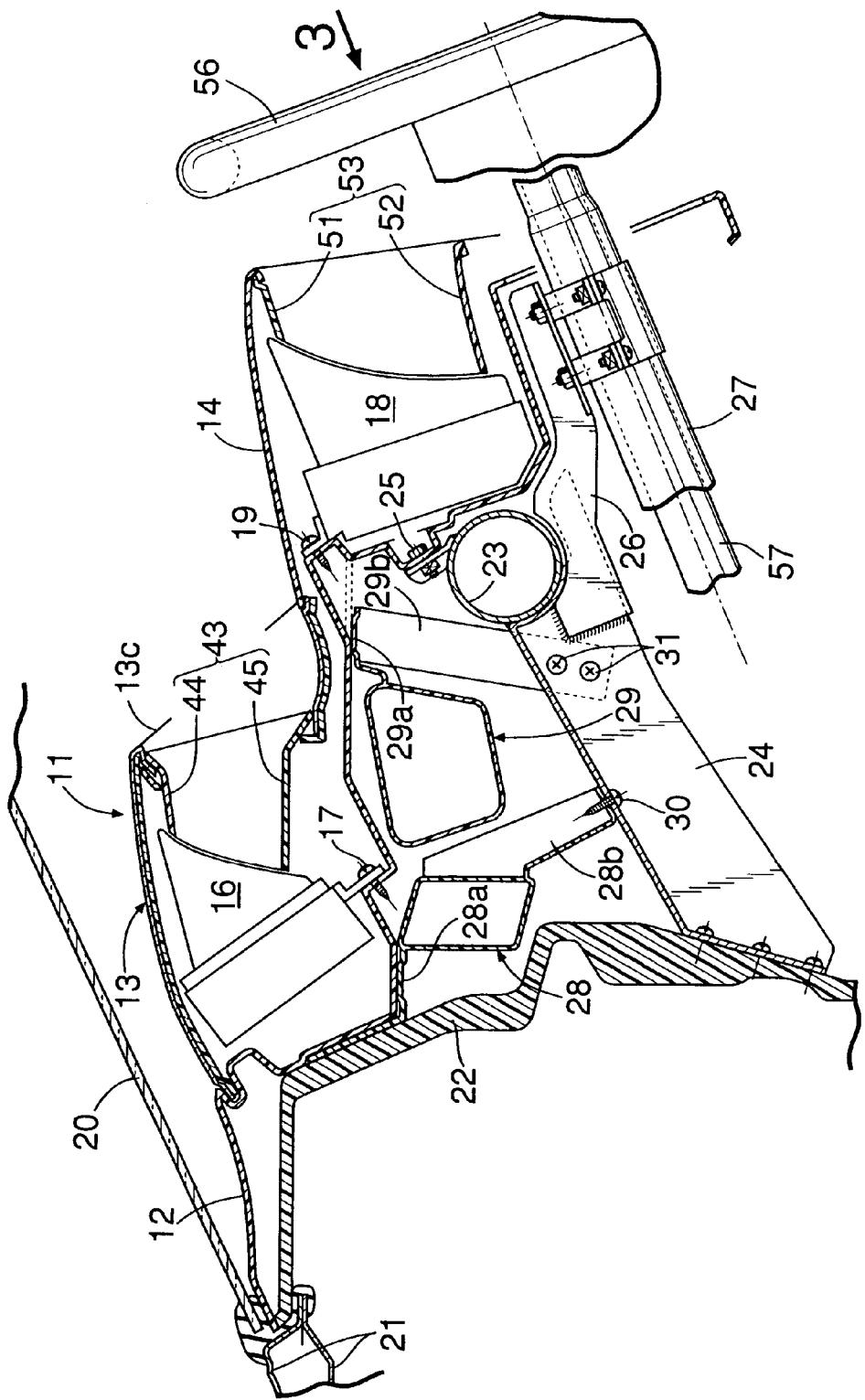
FIG. 2 is an enlarged sectional view along line 2—2 in FIG. 1.

As shown in FIG. 1 and FIG. 2, an instrument panel 11 that is disposed in a front part of a vehicle compartment of an automobile is formed from an instrument panel main body 12 that is molded as a unit from a synthetic resin, and an upper panel 13, a lower left panel 14, and a lower right panel 15, which are all mounted on a rear face of the instrument panel main body 12 at positions forward of a driver's seat and are all made of a synthetic resin. The instrument panel main body 12 is a sheet-like member that drops stepwise from the front to the rear; an upper meter 16 is fixed to a front portion of the instrument panel main body 12 at a high position by means of a tapping screw 17 so as to face rearward, and a lower meter 18 is fixed to a rear portion of the instrument panel main body 12 at a low position by means of a tapping screw 19 so as to face rearward.

Since the upper meter 16 is positioned in the vicinity of a lower edge of a windshield 20 and far from the driver, it is relatively easy for the driver, who has been looking forward through the windshield 20, to shift the line of sight to the upper meter 16 and focus the eyes on the upper meter 16. The upper meter 16, which has high visibility as described above, is provided with display means for travel information having relatively high importance and urgency, that is, a speedometer or a tachometer.

On the other hand, since the lower meter 18 is present at a position far from the lower edge of the windshield 20 and close to the driver, it is relatively difficult for the driver, who has been looking forward through the windshield 20, to shift the line of sight to the lower meter 18 and focus the eyes on the lower meter 18. The lower meter 18, which has low visibility as described above, is provided with display means for vehicle information having relatively low importance and urgency, that is, a fuel gauge, a water thermometer, an alarm lamp, various types of indicators, etc.

Fixed to the rear end of a cowl top 21 are the lower end of the windshield 20, the front end of the instrument panel main body 12, and the upper end of a dashboard lower part 22. The lower end of the dashboard lower part 22 is connected via a bracket 24 to a crossbeam 23 extending in the lateral direction of a vehicle body. Fixed to the crossbeam 23 via a bolt 25 is a lower face of a rear portion of the instrument panel main body 12. Fixed to a stay 26 connected to the crossbeam 23 is a steering column tube 27.

Disposed in the lateral direction of the vehicle body on the lower face of the instrument panel main body 12 are a first air conditioner duct 28 and a second air conditioner duct 29, which are blow-molded from a synthetic resin. An arm portion 28a extending forward and upward from the first air conditioner duct 28 is vibration-welded to the dashboard lower part 22 and the instrument panel main body 12. An arm portion 28b extending rearward and downward from the first air conditioner duct 28 is fixed to the bracket 24 via a tapping screw 30. An arm portion 29a extending rearward from the second air conditioner duct 29 is vibration-welded to the instrument panel main body 12. An arm portion 29b extending downward from the arm portion 29a is fixed to the bracket 24 via bolts 31.

In this way, although the upper meter 16 and the lower meter 18, which have a large weight, are respectively supported on the front part and the rear part of the instrument panel main body 12, since the instrument panel main body 12 is joined to the strong crossbeam 23 in the vicinity of the lower meter 18, the rigidity for supporting the rear portion of the instrument panel main body 12 is sufficient. On the other hand, the instrument panel main body 12 is joined to the dashboard lower part 22 in the vicinity of the upper meter 16, but this alone is not able to give a sufficient rigidity for supporting the instrument panel main body 12.

In the present embodiment, the lower portion of the dashboard lower part 22 and the crossbeam 23 are joined to each other via the strong bracket 24; furthermore, the front portion of the instrument panel main body 12 and the bracket 24 are connected to each other by utilizing the first air conditioner duct 28. Therefore, it is possible to strongly support the front portion of the instrument panel main body 12 by mutual reinforcement between the crossbeam 23, the dashboard lower part 22, the bracket 24, and the first air conditioner duct 28. In particular, by utilizing the existing first air conditioner duct 28, it is possible to minimize any increase in the number of components for reinforcement. Moreover, since the first air conditioner duct 28 and the instrument panel main body 12 are connected by vibration-welding, it is possible to strongly integrate the first air conditioner duct 28 and the instrument panel main body 12, thus further enhancing the support rigidity.

The structure of the area around the upper meter 16 is now described by reference to FIG. 1, and FIG. 4 to FIG. 7.

The upper edge of the upper panel 13 is detachably secured to the instrument panel main body 12 in front of the driver by means of a plurality of clips 13a. Clips 14a provided at the upper edge of the lower left panel 14 are detachably secured to clips 13b provided on the lower edge of the lower panel 13. The lower right panel 15 is secured to the lower edge of the upper panel 13 in a similar manner. The upper panel 13 has a structure in which the surface of a core material 41 is covered by a skin 42, and an opening 13c facing the rear face of the upper meter 16 is formed in the middle of the upper panel 13. A meter visor 43 providing a connection between the upper meter 16 and the opening 13c of the upper panel 13 is formed from two sections, that is, an upper meter visor 44 and a lower meter visor 45.

The upper meter visor 44 is installed from the front to the rear so as to conform to the upper edge of the opening 13c of the upper panel 13, and is fixed to the upper panel 13 via four tapping screws 46. In this process, an edge portion e that is formed by folding the upper edge of the opening 13c of the upper panel 13 downward and forward into a J-shape is engaged with a groove a formed so as to conform to the rear edge of the upper meter visor 44.

In this way, since the upper meter visor 44 is installed in the opening 13c of the upper panel 13 from the front to the rear instead of being mounted from the rear to the front, it is possible to eliminate the necessity for pushing and bending upward the upper edge of the opening 13c when mounting the upper meter visor 44, thus enhancing the ease of mounting the upper meter visor 44. Moreover, since the groove g formed at the rear end of the upper meter visor 44 is engaged with the edge portion e formed by folding the upper edge of the opening 13c of the upper panel 13 downward and forward, it is possible to eliminate the necessity for providing the upper edge of the opening 13c of the upper panel 13 with a mounting seat for mounting the rear end of the upper meter visor 44, thereby suppressing upward protrusion of the upper edge of the opening 13c of the upper panel 13 and ensuring a forward view for the driver.

Furthermore, since the groove a at the rear end of the upper meter visor 44 is engaged with the edge portion e of the opening 13c of the upper panel 13, it is possible to retain the folded back portion (ear portion) of the skin 42 of the upper panel 13 by means of the groove a, thus improving the appearance. Moreover, since a plurality of triangular ribs 13d (see FIG. 6) are provided on the inside of the edge portion e of the opening 13c of the upper panel 13 on which the upper meter visor 44 is mounted, it is possible to reinforce boss portions through which the tapping screws 46 run.

The lower meter visor 45 is mounted from the rear to the front so as to conform to the lower edge and left and right edges on opposite sides of the opening 13c of the upper panel 13, and includes a U-shaped visor face formed from the lower wall 45a and the left and right side walls 45b and 45c, and a decorative surface 45d that forms a smooth connection to the surface of the upper panel 13. The lower wall 45a and the left and right side walls 45b and 45c of the lower meter visor 45 can cover the perimeter of the upper meter 16 in cooperation with the upper meter visor 44. Since seams between the upper meter visor 44 and the lower meter visor 45 are positioned in corner portions where left and right ends of the upper meter visor 44 abut against upper ends of the left and right side walls 45b and 45c of the lower meter visor 45, and extend parallel to the line of sight and away from the driver, it is possible to make the seams less noticeable, thereby improving the appearance.

Whereas the upper meter visor 44 is mounted on the upper panel 13 from the front to the rear, the lower meter visor 45 is mounted on the upper panel 13 from the rear to the front; and in this process, a plurality of clips 45e provided on the lower meter visor 45 engage with a plurality of clips 13e provided on the upper panel 13, a plurality of ribs 45f provided on the lower meter visor 45 engage with a plurality of slits 13f provided in the upper panel 13, and two pins 45g provided on the lower meter visor 45 are fitted in pin holes 44a provided in the upper meter visor 44, thereby fixing the upper meter visor 44 and the lower meter visor 45 to the upper panel 13.

In this way, by providing the decorative surface 45d on the lower meter visor 45, it is possible to easily ensure a space for providing the clips 45e and the ribs 45f for fixing the lower meter visor 45 to the upper panel 13, and the rigidity for supporting the lower meter visor 45 can be enhanced. Moreover, since the lower edge of the opening 13c of the upper panel 13 is retained from above by means of the rear end of the lower meter visor 45, the lower edge of the opening 13c of the upper panel 13 becomes invisible, thus improving the appearance.

The structure of the area around the lower meter 18 is now described by reference to FIG. 1 and FIG. 8 to FIG. 11.

Mounted on the lower side of the upper panel 13 are the lower left panel 14 and the lower right panel 15. Formed in the lower left panel 14 are an inverted U-shaped opening 14b and an air conditioner outlet 14c positioned to the left of the opening 14b. Formed in the lower right panel 15 are a mounting opening 15a for a monitor of a navigation system, a mounting opening 15b for an audio system, and an air conditioner outlet 15c. Furthermore, the rectangular lower meter 18 is positioned in the upper part and forward of the inverted U-shaped opening 14b of the lower left panel 14. A meter visor 53 formed from an upper meter visor 51 and a lower meter visor 52 is mounted within the opening 14b. The upper meter visor 51 and the lower meter visor 52 are both formed into an inverted U-shape. Brackets 51a provided at opposite ends of a lower portion of the upper meter visor 51 are each fixed to brackets 52a provided at opposite ends of an upper portion of the lower meter visor 52 via two tapping screws 54.

The assembled meter visor 53 is mounted in the opening 14b of the lower left panel 14 from the front to the rear, and two tapping screws 55 running through each of two brackets 51b provided on an upper face of the upper meter visor 51 are secured to boss portions 14d provided on the lower left panel 14. Furthermore, two ribs 14e projectingly provided on opposite sides of a lower portion of the opening 14b of the lower left panel 14 engage with two slits 52b formed in the lower meter visor 52, and two pins 14f projectingly provided on opposite sides in a middle portion of the opening 14b of the lower left panel 14 engage with pin holes 51f formed in the brackets 51b of the upper meter visor 51, so that the meter visor 53 is correctly positioned relative to the lower left panel 14.

Figure 9:
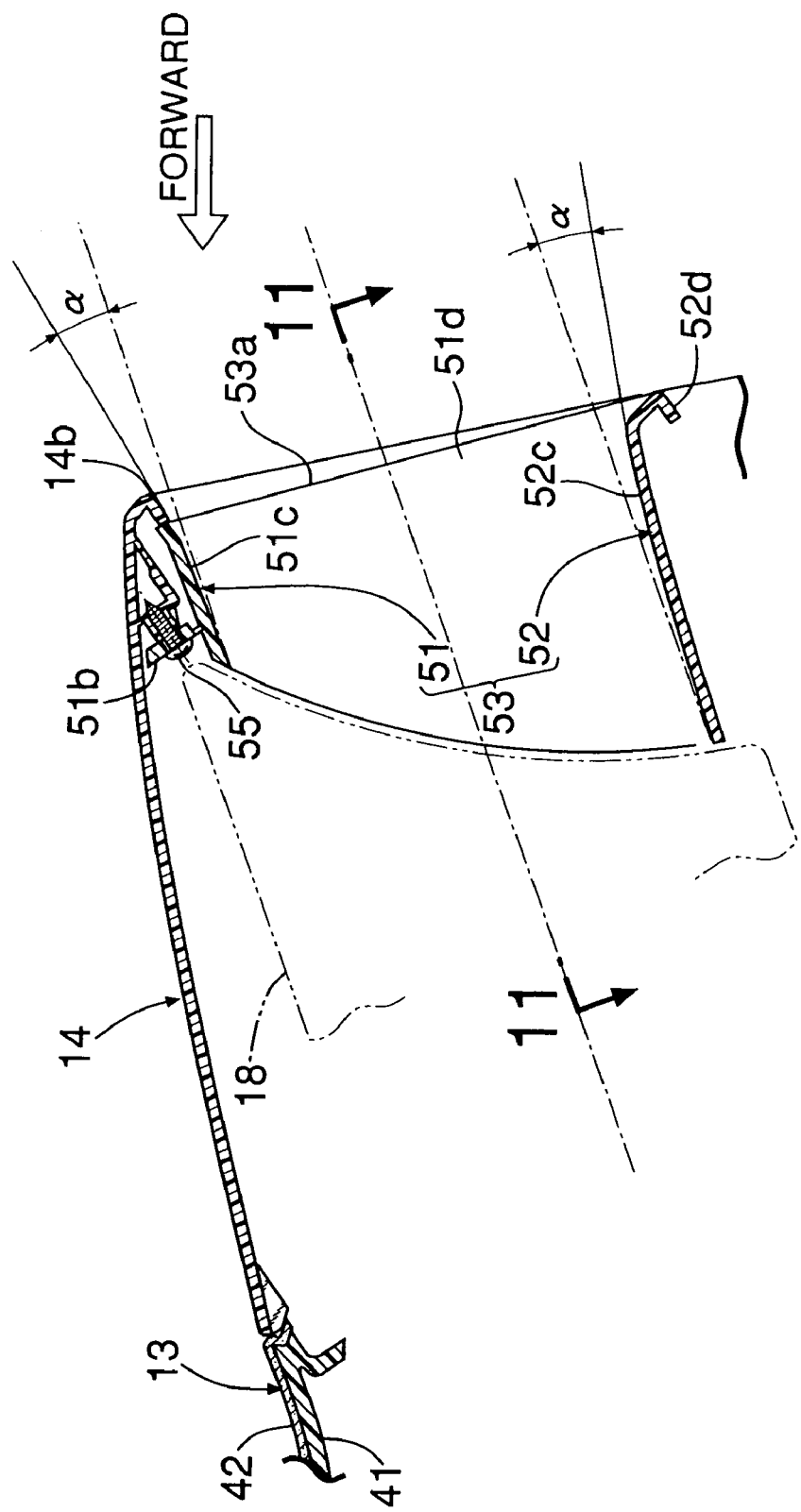
FIG. 9 is a sectional view along line 9—9 in FIG. 8.
Figure 10:
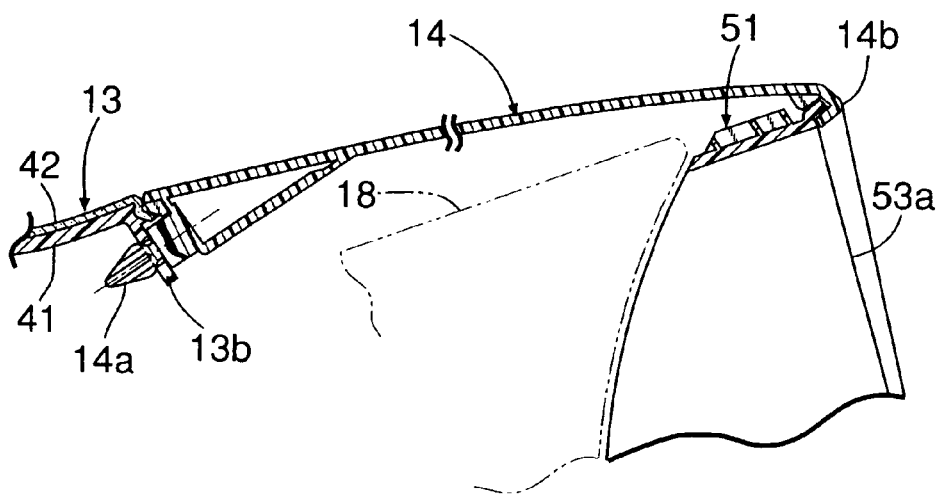
FIG. 10 is a sectional view along line 10—10 in FIG. 8.

As is clear from FIG. 9, an upper wall 51c and a lower wall 52c of the meter visor 53 disposed in the opening 14b of the lower left panel 14 are tapered toward the lower meter 18, that is, toward the front, by an angle α. Although the height of the eyes varies greatly according to the height of a driver seated on a seat, since the spacing between the upper wall 51c and the lower wall 52c narrows from the opening 53a of the meter visor 53 toward the lower meter 18, it is possible to prevent upper and lower edges of the lower meter 18 from being hidden by upper and lower edges of the opening 53a of the meter visor 53 to become invisible.

Figure 11:
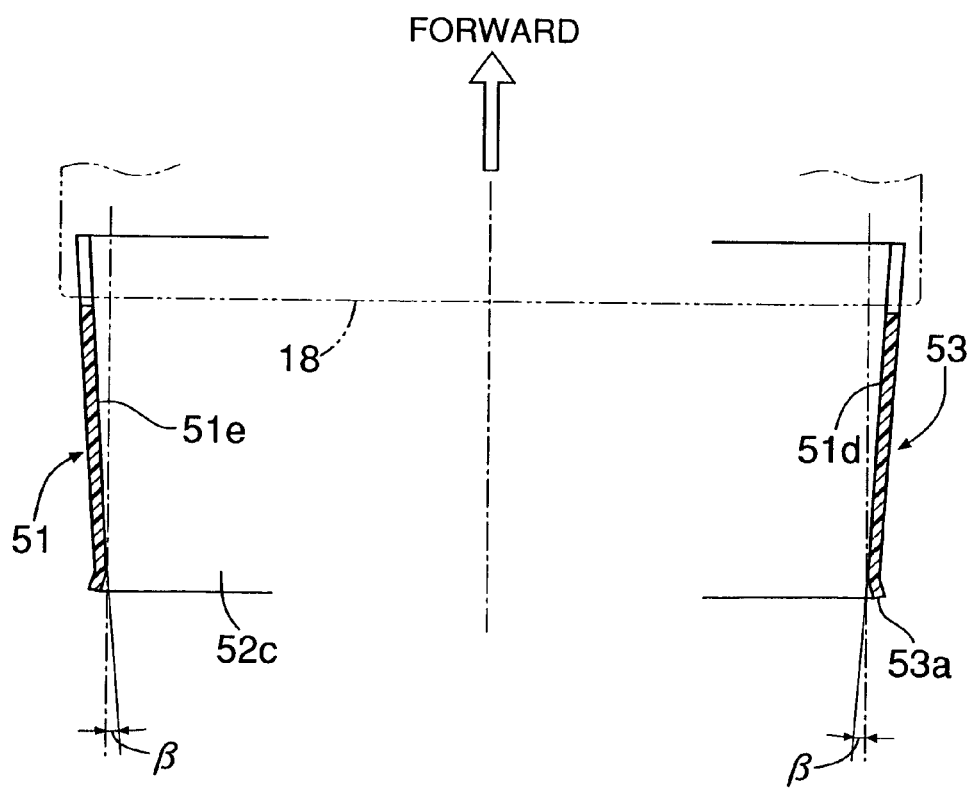
FIG. 11 is a sectional view along line 11—11 in FIG. 9.

On the other hand, the lateral position of the eyes changes little even when the height of drivers varies as long as the driver is seated correctly on the seat. Therefore, as shown in FIG. 11, even if the spacing between left and right side walls 51d and 51e of the meter visor 53 is made to widen from the opening 53a toward the lower meter 18, that is, toward the front, by an angle β, there is no possibility of the left and right side edges of the lower meter 18 being hidden by the left and right side edges of the opening 53a of the meter visor 53 to become invisible. It is therefore possible to minimize the area of the opening 53a of the meter visor 53, suppress the reflection of light on the surface of the lower meter 18 so as to enhance the visibility, ensure a large area for the surface of the lower left panel 14, and utilize the surface effectively.

Moreover, when the spacing between the upper wall 51c and the lower wall 52c of the meter visor 53 narrows toward the front, and the spacing between the left and right side walls 51d and 51e widens toward the front, it becomes difficult to mold the meter visor 53 from one member in connection with undercut or draft. However, since the meter visor 53 is divided into two, that is, the upper meter visor 51 and the lower meter visor 52, the molding thereof becomes easy.

Moreover, since the meter visor 53 is formed by joining the upper meter visor 51 that has the upper wall 51c and the left and right side walls 51d and 51e, and the lower meter visor 52 that has the lower wall 52c, seams between the upper meter visor 51 and the lower meter visor 52 are positioned in corner portions on the lower left and right sides of the rectangular cross-section meter visor 53 and extend parallel to the line of sight and away from the driver, thus making the seams less noticeable. Furthermore, since the meter visor 53 is formed from the upper meter visor 51 and the lower meter visor 52, and the lower meter visor 52 defines an upper face of an opening 52d through which a steering shaft 57 having a steering wheel 56 at its rear end runs, not only is it possible to reduce the number of components because it is unnecessary to employ a special member for defining the upper face of the opening 52d through which the steering shaft 57 runs, but it is also possible to reduce the number of seams due to the reduction in the number of components, thus improving the appearance.

Figure 3:
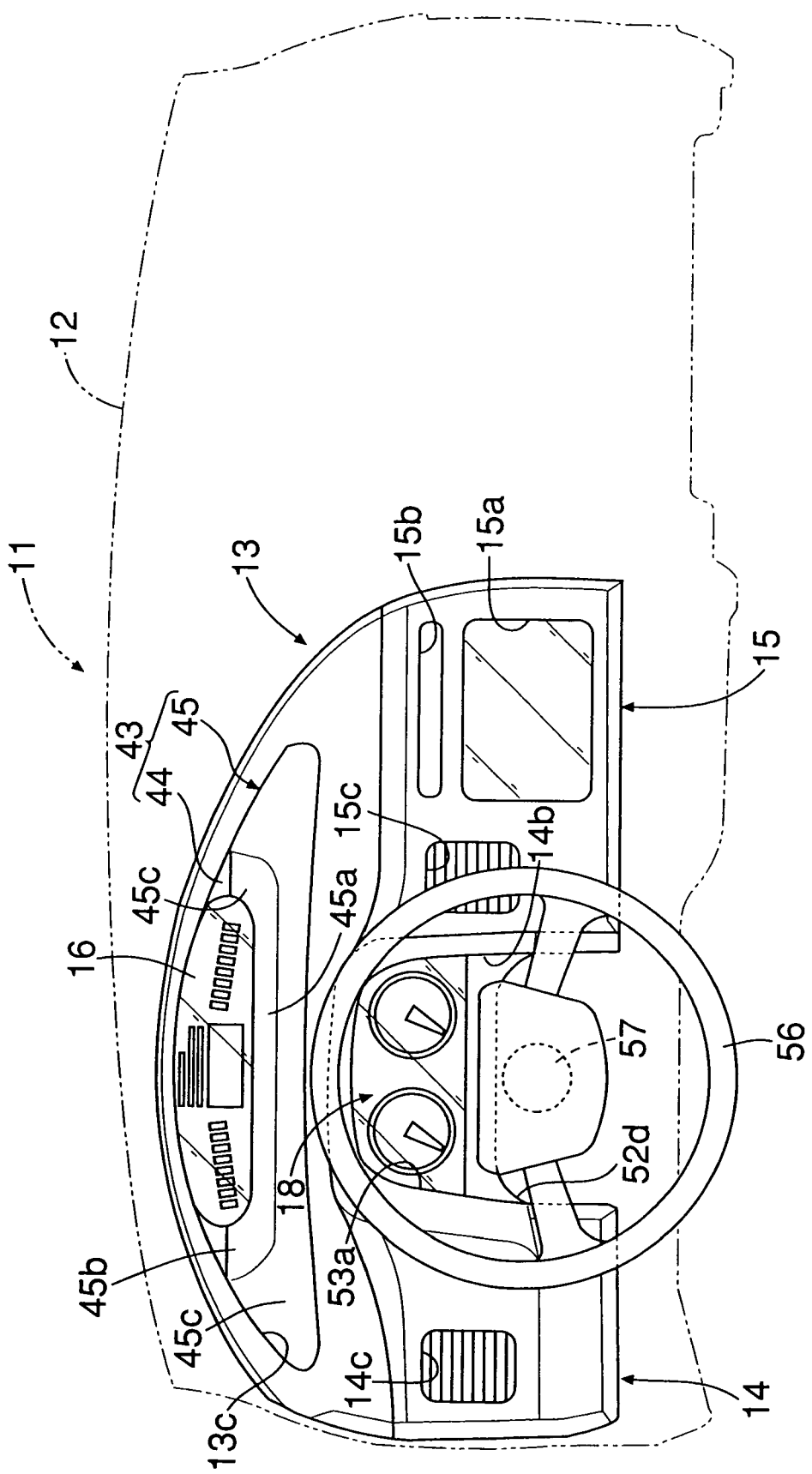
FIG. 3 is a view from arrow 3 in FIG. 2.
Figure 4:
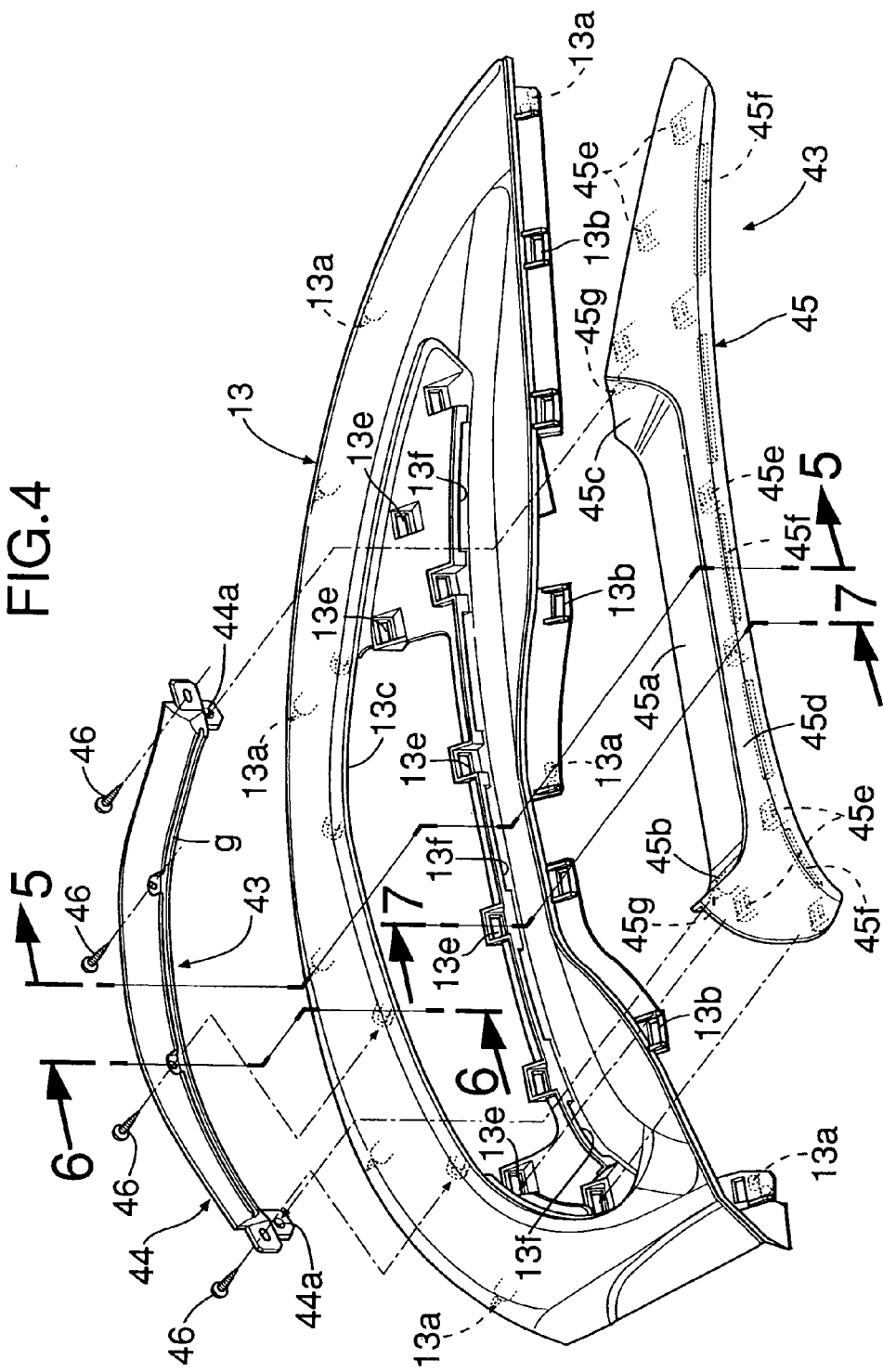
FIG. 4 is an exploded perspective view of an upper panel and a meter visor.
Figure 5:
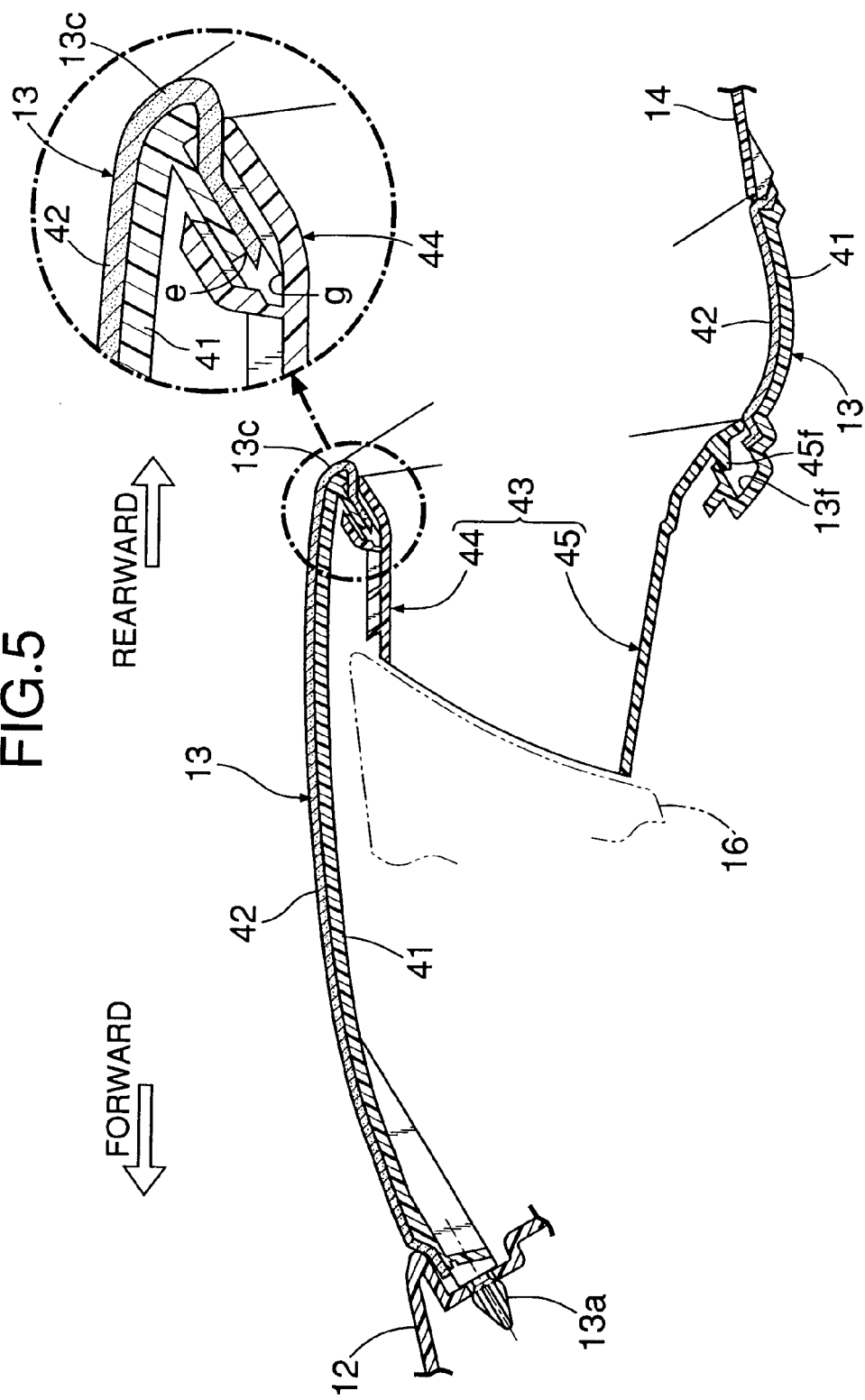
FIG. 5 is a sectional view along line 5—5 in FIG. 4.
Figure 6:
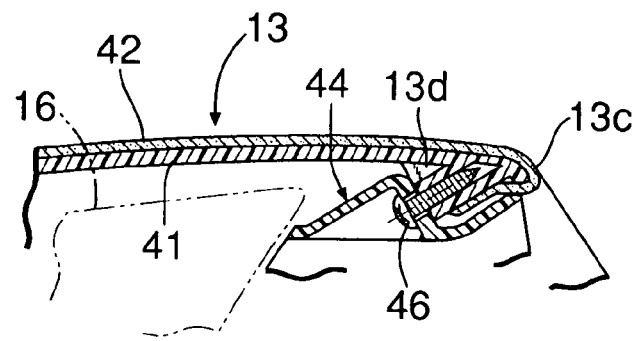
FIG. 6 is a sectional view along line 6—6 in FIG. 4.
Figure 7:
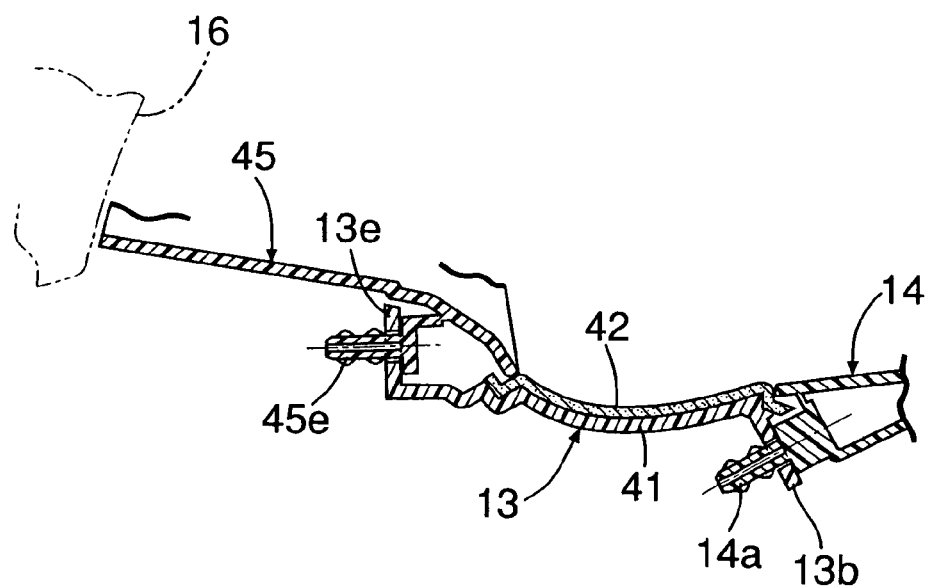
FIG. 7 is a sectional view along line 7—7 in FIG. 4.
Figure 8:
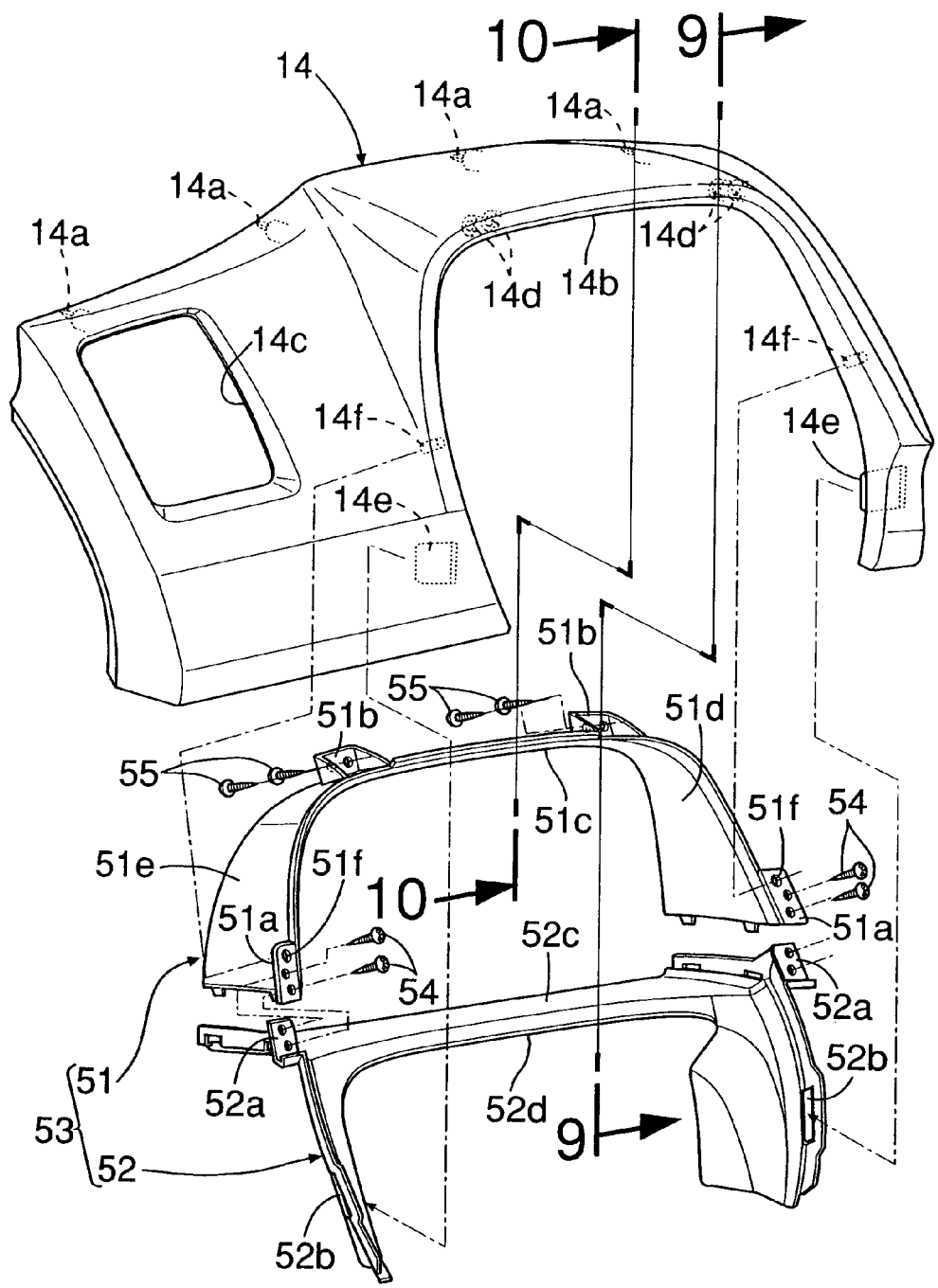
FIG. 8 is an exploded perspective view of a lower left panel and the meter visor.

Furthermore, as is clear from FIG. 3, since the upper meter 16 provided in the upper front part of the instrument panel main body 12 is positioned so as to correspond to an upper side of an upper half of the steering wheel 56, and the lower meter 18 provided in the lower rear part of the instrument panel main body 12 is positioned so as to correspond to a lower side of the upper half of the steering wheel 56, it is possible to reliably view the upper meter 16 and the lower meter 18 without being obstructed by the steering wheel 56. Moreover, an upper meter is conventionally disposed at a position displaced from the front of the driver, that is, in a laterally middle portion of the instrument panel main body, however, in the present embodiment, since the upper edge of the upper panel 13 having the upper meter 16 is made in an arc shape that substantially conforms to the upper half of the steering wheel 56, there is no disagreeable sensation even when the upper meter 16 is positioned in the arc shaped portion of the upper panel 13 in front of the driver.

Furthermore, since the upper panel 13, the lower left panel 14, and the lower right panel 15 can be attached to and detached from the instrument panel main body 12, not only is it possible to easily carry out maintenance for the upper meter 16 and the lower meter 18 by removing these panels 13, 14, and 15, but it is also possible to enhance the design by employing various structures or materials such that, for example, the upper panel 13 has a skin and the lower left panel 14 and the lower right panel 15 have no skin. Moreover, by curving downward the rear edge of a canopy portion of the upper panel 13 covering the upper meter 16 in order to ensure a forward view for the driver through the windshield 20, there is no interference when the upper meter 16 is mounted on the instrument panel main body 12.

Furthermore, since the upper meter 16 is disposed in the upper part of the instrument panel main body 12, it is possible to suppress the amount in which the line of sight moves when the line of sight is moved between the view in front of the windshield 20 and the upper meter 16, thus enhancing the visibility of the upper meter 16. Moreover, since the upper meter 16 is disposed in the front part of the instrument panel main body 12, the distance between the driver and the upper meter 16 increases and focusing of the eyes becomes easy, thus further enhancing the visibility of the upper meter 16. In this way, since the upper meter 16 having high visibility is provided with the speedometer and the tachometer which are highly important, it is possible to reliably read the speedometer and the tachometer.

Although an embodiment of the present invention has been described above, the present invention can be modified in a variety of ways without departing from the subject matter thereof.

For example, in the embodiment, the spacing between the left and right side walls 51*d* and 51*e* of the meter visor 53 widens from the opening 53*a* toward the lower meter 18, but the left and right side walls 51*d* and 51*e* may be parallel to each other.

What is claimed is:

1. An automobile instrument panel structure in which an upper meter and a lower meter are respectively supported on an upper front part and a lower rear part of an instrument panel main body, and a panel is detachably fixed to the instrument panel main body so as to surround a perimeter of the upper meter and a perimeter of the lower meter, wherein the upper meter and the lower meter are respectively disposed so as to correspond to an upper side and a lower side of an upper half of a steering wheel, and, wherein an upper edge of the panel has a shape substantially conforming to the upper half of the steering wheel, further comprising a meter visor, wherein the panel is formed from a core material and a skin, has an opening formed therein so as to surround the perimeter of the meters and is fixed to the instrument panel main body;

wherein the meter visor provides a connection between the perimeter of the meters and the opening of the panel, and is formed from an upper meter visor and a lower meter visor; and wherein a groove formed at a rear end of the upper meter visor is engaged with an edge portion formed by folding an upper edge of the opening downward and forward.

2. The automobile instrument panel structure according to claim 1, wherein a lower edge of the opening is retained from above by means of the rear end of the lower meter visor.

3. The automobile instrument panel structure according to claim 1, wherein the upper meter visor is connected to the upper edge of the opening, and the lower meter visor is connected to the lower edge and left and right edges on opposite sides of the opening.

4. The automobile instrument panel structure according to claim 1, wherein the lower meter visor has a decorative surface that forms a smooth connection to the surface of the panel.

5. The automobile instrument panel structure according to claim 1, wherein a rib is provided on a reverse side of the opening of the panel which is covered by the upper meter visor.

6. An automobile instrument panel structure in which an upper meter and a lower meter are respectively supported on an upper front part and a lower rear part of an instrument panel main body, and a panel is detachably fixed to the instrument panel main body so as to surround the perimeter of a upper meter and a perimeter of the lower meter, wherein the upper meter and the lower meter are respectively disposed so as to correspond to an upper side and a lower side of an upper half of a steering wheel, and wherein an upper edge of the panel has a shape substantially conforming to the upper half of the steering wheel, further comprising a meter visor, wherein the instrument panel main body is adapted to support a substantially rectangular meter;

the panel fixed to the instrument panel main body defines an opening to a rear of the upper and lower meters;

the meter visor provides a connection between the perimeter of the upper and lower meters and the opening of the panel, and is formed from an upper wall, a lower wall, and left and right side walls;

a vertical spacing between the upper wall and the lower wall of the meter visor narrows toward one of the upper and lower meters; and a lateral spacing between the left and right side walls of the meter visor is constant or widens toward one of the upper and lower meters.

7. The automobile instrument panel structure according to claim 6, wherein the meter visor is formed from an upper meter visor that has an upper wall and left and right side walls, and a lower meter visor that has a lower wall connected to lower ends of the left and right side walls.

8. The automobile instrument panel structure according to claim 6, wherein the meter visor is formed from an upper meter visor and a lower meter visor, and the lower meter visor defines an upper face of an opening through which a steering shaft runs.

9. An automobile instrument panel structure in which an upper meter and a lower meter are respectively supported on an upper front part and a lower rear part of an instrument panel main body, and a panel is detachably fixed to the instrument panel main body so as to surround a perimeter of the upper meter and a perimeter of the lower meter, wherein the upper meter and the lower meter are respectively disposed so as to correspond to an upper side and a lower side of an upper half of a steering wheel, and wherein an upper edge of the panel has a shape substantially conforming to the upper half of the steering wheel, wherein at least a rear portion of the instrument panel, on a front portion of which the meters are supported, is joined to a crossbeam extending in a lateral direction of a vehicle body;

a dashboard lower part positioned forward of the instrument panel and the crossbeam are connected to each other via a bracket; and the front portion of the instrument panel and the bracket are connected to each other via an air conditioner duct that extends in the lateral direction of the vehicle body.

10. The automobile instrument panel structure according to claim 9, wherein the air conditioner duct and the instrument panel are connected by vibration-welding.

* * * * *